United States Patent [19]

Chelin et al.

[11] 4,195,321
[45] Mar. 25, 1980

[54] APPARATUS FOR LOADING A PLURALITY OF FLOPPY DISKS IN A READING AND/OR WRITING UNIT

[75] Inventors: Cesare Chelin, Caluso; Armando Costa, Ivrea, both of Italy

[73] Assignee: Ing. C. Olivetti & Co., S.p.A., Italy

[21] Appl. No.: 896,220

[22] Filed: Apr. 13, 1978

[30] Foreign Application Priority Data

Apr. 20, 1977 [IT] Italy .................... 67873 A/77

[51] Int. Cl.² ............................................ G11B 17/00
[52] U.S. Cl. ................................. 360/98; 274/10 E
[58] Field of Search ............................. 360/97–99, 360/86, 133, 81, 88; 274/10 E; 40/476; 353/DIG. 1

[56] References Cited

U.S. PATENT DOCUMENTS

| | | | |
|---|---|---|---|
| 2,209,517 | 7/1940 | Flanagan et al. | 40/476 |
| 3,273,454 | 9/1966 | Bast | 353/DIG. 1 |
| 3,423,863 | 1/1969 | Heisler | 353/DIG. 1 |
| 3,725,883 | 4/1973 | Bennett et al. | 360/97 |
| 3,846,836 | 11/1974 | Masse et al. | 360/98 |
| 3,931,640 | 1/1976 | Takahara et al. | 360/98 |
| 4,024,581 | 5/1977 | Lesca et al. | 360/99 |

FOREIGN PATENT DOCUMENTS 2655289 8/1978 Fed. Rep. of Germany .... 353/DIG. 1

*Primary Examiner*—John H. Wolff
*Attorney, Agent, or Firm*—Schuyler, Birch, McKie & Beckett

[57] ABSTRACT

The apparatus is used for the automatic sequential handling of floppy disks and includes a disk writing and reading unit, a loading stacker and a receiving stacker. A single disk can be inserted in the top part of the unit, whereas a pack of disks is placed in the loading stacker. A plate dividing the loading stacker from the receiving stacker can be moved to bring the bottom part of the unit into communication with the loading stacker and the receiving stacker alternately.

The disks are inserted one after another into the bottom part of the unit by a moving slider when the latter is shifted from left to right and the plate is lowered. A feeding tooth detaches the disk at the bottom of the pack and positions it with respect to the slider.

During the right-to-left return movement of the slider, the plate is raised and a pair of pincers mounted on the slider withdraws the written or read disk from the bottom part of the unit, and lets it fall into the receiving stacker.

4 Claims, 19 Drawing Figures

APPARATUS FOR LOADING A PLURALITY OF FLOPPY DISKS IN A READING AND/OR WRITING UNIT

BACKGROUND OF THE INVENTION

1. Field of Invention

The present invention relates to an apparatus for the automatic loading of flexible magnetic disks, each one contained in a protective envelope into a writing and/or reading unit, said apparatus comprising a loading stacker in which the disks to be handled are arranged, and a receiving stacker in which the disks are stored after handling.

The magnetic disks handled by the apparatus forming the subject of the invention, known in the trade as floppy disks, are formed of a plastic or cardboard envelope inside which is arranged a flexible magnetic disk with a memory capacity of about 250 Kbyte.

2. Description of the Prior Art

In a known apparatus of the type referred to above, the disks to be handled are arranged vertically side by side in a loading stacker placed on top of the writing unit, towards which the disk selected is pushed by a pair of entrainment rollers. In said known apparatus, a treated disk is pushed upwards by a special ejection device and again gripped by the entrainment rollers, which, by turning in the opposite direction carry the disk away from the writing unit and pile it upright in a receiving stacker flanking the loading stacker. Said apparatus, however, has the disadvantage of being too bulky, since its loading and receiving stackers are on top of the writing unit. In addition, the employment of a pair of rollers permanently gripping each other for the conveyance of the disk makes the apparatus poorly reliable, particularly during the extraction of already handled disks.

SUMMARY OF THE INVENTION

The object of the present invention is to provide an apparatus that will automatically and sequentially handle a plurality of floppy disks and be both compact and reliable.

According to the present invention the apparatus is characterised by the fact that the loading stacker and the receiving stacker are mounted alongside the writing unit, and that a selectively operable slider transfers a disk to be handled from the loading stacker to the writing unit and also extracts the treated disk for conveyance to the receiving stacker.

BRIEF DESCRIPTION OF THE DRAWING

The present invention will be described in more detail, by way of example, with reference to the accompanying drawings, in which:

FIG. 16 is a schematic view of the apparatus according to the invention in three different operating positions (FIG. 16a, FIG. 16b, and FIG. 16c).

DESCRIPTION OF PREFERRED EMBODIMENT

Figure 2:
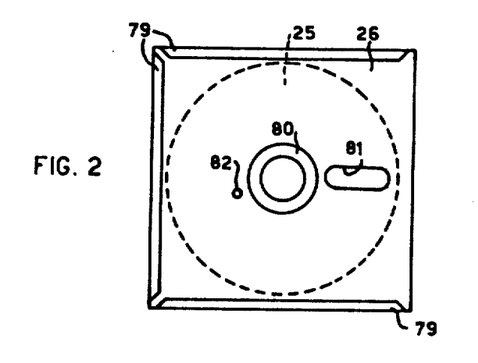
FIG. 2 is a plan view of an envelope containing a magnetic disk treated by the apparatus according to the invention.

The apparatus according to the invention is suitable for handling floppy disks 25 (FIG. 2), each of the said disks being contained in its own standard-type envelope 26. Such envelopes are normally made up of a paper or plastic sheet closed on three sides by flaps 79 superimposed on one side of the sheet and glued to the same, and are provided with a central hole 80, a radial slot 81. and a synchronisation aperture 82.

The apparatus according to the invention (FIGS. 1 and 3) comprises a supporting frame 10 with two sidepieces 11 and 12, and a pair of transverse plates 13 and 55 that substantially divide said apparatus into two parts, namely a front part 14 and a back part 15. The front part 14 includes a loading stacker 16 and a receiving stacker 17 for the disks 25, while the back part 15 contains a writing and/or reading unit 18.

The unit 18 is of the type described in U.S. Pat. No. 4,024,581 issued on May 17, 1977, and comprises a plate 20, supported by the frame 10, on which are hinged guide arms 21 and 22, set on opposite sides with respect to the plate 20. Each arm 21,22 can guide a floppy disk 25 contained in its envelope 26 and position it with respect to a spindle 27 and its corresponding writing and/or reading head. A mechanism for the automatic ejection of the envelope 26 (shown generically as 29) is mounted on each pair of arms 21,22 for operating the ejection of the envelope 26 containing the already treated disk from the unit 18. Also said mechanism is described in the U.S. Pat. No. 4,024,581.

Figure 1:
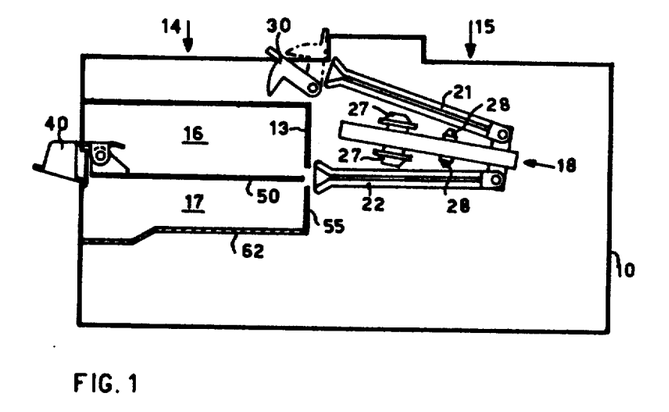
FIG. 1 is a schematic and sectioned side view of an apparatus in accordance with the invention.
Figure 3:
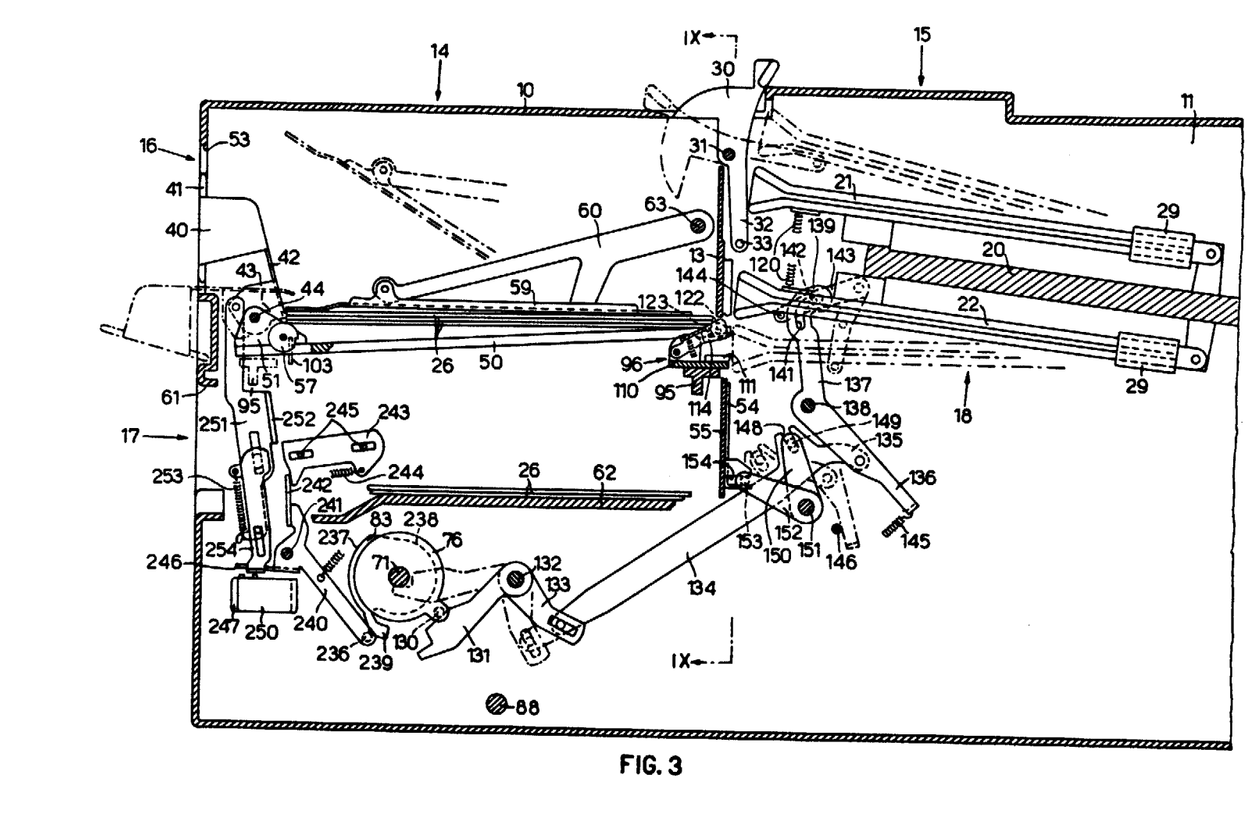
FIG. 3 is a partly sectioned side view of the apparatus according to the invention.

Arms 21, 22 can move between an operating position, as shown in FIG. 3, and the insertion position shown in FIG. 1. Arms 21 are manually operated by means of an upper catch 30, while arms 22 are operated automatically during the loading cycle for the disks housed in stacker 16, as will be described later.

Catch 30 is hinged on a pivot 31 and has a projection 32 carrying a pin 33 that engages the bottom part of arms 21 and so shifts said arms 21 from the operating position to the insertion position indicated by the dotted line in FIG. 3.

The loading stacker 16 is substantially parallelepiped in shape, and has a front aperture 53 from which the envelopes 26 holding the disks 25 are loaded. Said stacker 16 can carry twenty envelopes 26 piled one on top of the other. A shutter 40 is hinged with its tabs 43 on a pin 44 of the frame 10 and set in front of the aperture 53. Shutter 40 is shaped in such a way as to have a handle 41 and an inside wall 42 which, when shutter 40 is open (FIG. 4) is set substantially horizontal to facilitate the insertion of the pack of disks to be handled, while when shutter 40 is closed it is slightly sloping away from the upright position and so facilitates the stacking of the envelopes 26. A substantially horizontal plate 50 (FIG. 1) is placed between stacker 16 and stacker 17 and constitutes the base of said stacker 16. Plate 50 has two lateral tabs 51 pivoted on pin 44 and is moved between a first operating position (FIG. 5) and a second operating position (FIG. 3) by means of a vertical slider 54 (FIG. 5) that runs on a transverse plate 55.

Figure 4:
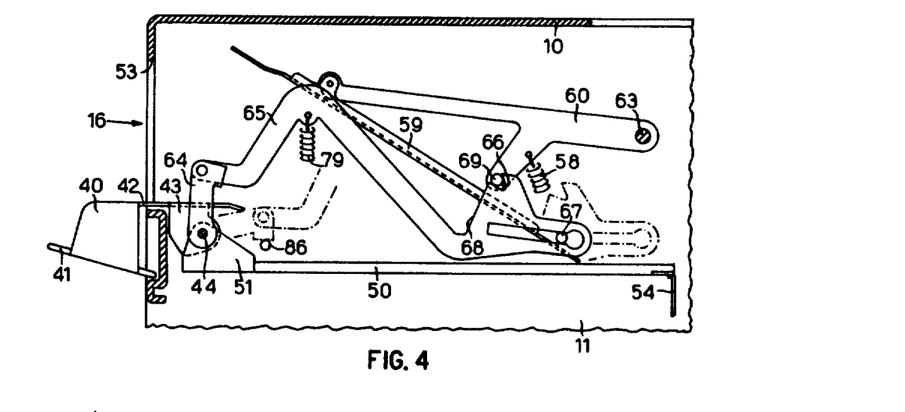
FIG. 4 is a first detailed view of the apparatus according to the invention in one of its operating positions.
Figure 5:
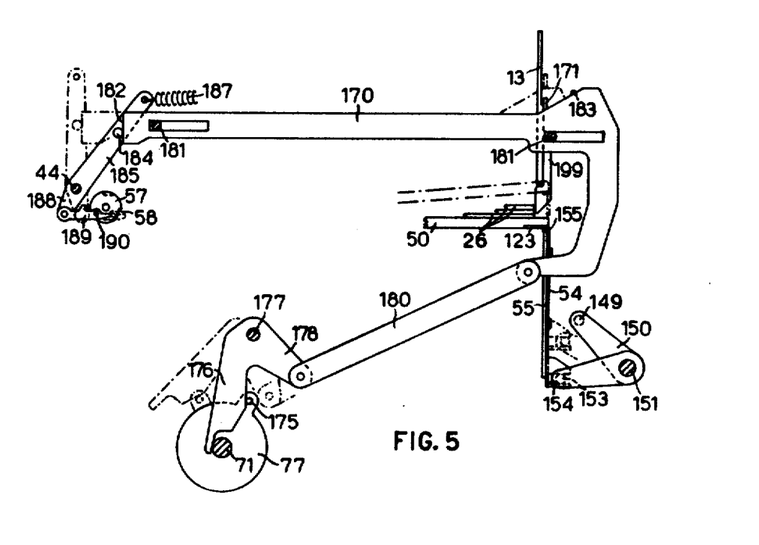
FIG. 5 is a second detailed view of the apparatus according to the invention in its idle position.
Figure 6:
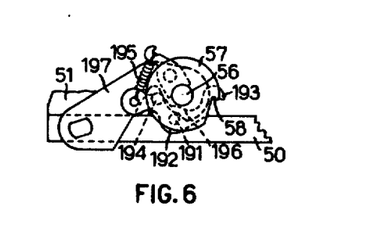
FIG. 6 is a third detailed and enlarged view of the apparatus according to the invention in its idle position.

A metal roller 57 shaped so as to have a feeding tooth 58 with a step of 0.6 mm (FIG. 6) turns about a pin 56 rotatably mounted on tabs 51 of plate 50 and is driven by a mechanism described in detail later. The pack of envelopes 26 inserted in stacker 16 (FIG. 3) rests frontally on roller 57 and posteriorly on plate 50 and is pushed downwards by a pressure plate 59 carried by a lever 60 pivoting on a pin 63 and usually held down by a spring 58 (FIG. 4). When shutter 40 is opened, pressure plate 59 is raised to facilitate insertion of the disks into stacker 16. In particular, a crank 64, also pivoting on pin 44, is integral with shutter 40 and has one of its ends linked to a slider 65 which is slidably mounted with reference to a fixed pin 67 of frame 10.

Slider 65 is shaped as to have a straight side 68 and a notch 66 designed to engage with pin 69 of lever 60. A spring 79 holds slider 65 down and a fixed pin 86 stops crank 64 when shutter 40 is closed. Stacker 17 (FIG. 3) is also substantially parallelepiped in shape, and has a front aperture 61 through which the envelopes containing the already treated disks 25 are extracted. The bottom of stacker 17 consists of a fixed plate 62 supported by the sides 11 and 12 of frame 10.

Figure 12:
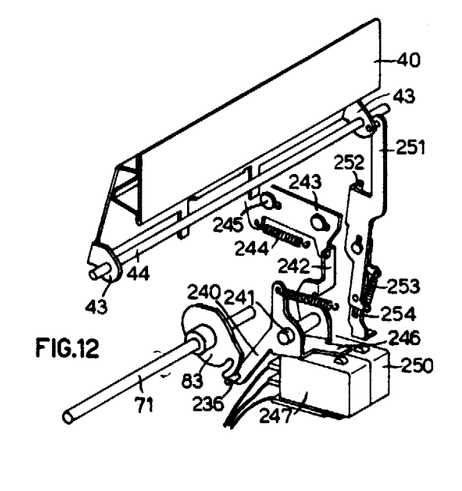
FIG. 12 is a perspective view showing a fifth detailed view of the apparatus according to the invention in its idle position.

Below stacker 17 there is a two-way electric motor 70 (FIG. 14) which selectively rotates a shaft 71 via a drive belt 72, and has a reduction coupling consisting of a worm screw 73 and a gear wheel 74. Shaft 71 is rotatably mounted on sides 11, 12 of frame 10. A crank 75 and four cams 76,77,78 and 83 (FIG. 12) are splined to shaft 71.

Figure 11:
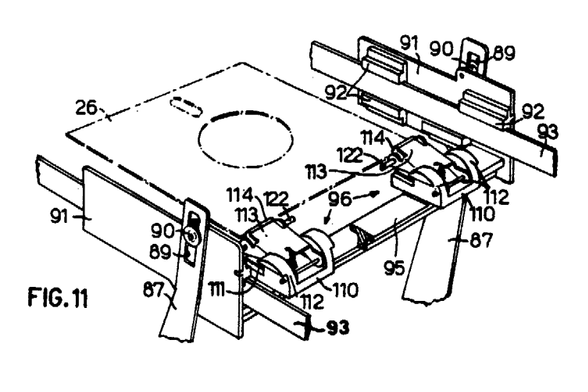
FIG. 11 is a perspective view showing a fifth detailed view of the apparatus according to the invention in one of its operating positions.

Crank 75 (FIG. 8) rocks a pair of connecting rods 87 fixed to a shaft 88 that pivots on frame 10. Each rod 87 has a slot 89 housing the pin 90 of a corresponding slide 91. The right-hand rod 87 is provided with a U-shaped arm 97 that forms a slot 98 that engages with stud 99 of crank 75. A pin 100 of the arm 97 serves as the pivot for a lever 101 shaped in such a way as to have a tooth-like bend 102, designed to engage with two fixed pins 104, 105 of the side 11, a bottom shoulder 106 and a side 107. A spring 108 stretched between the right-hand rod 87 and lever 101, normally keeps shoulder 106 still against a pin 109 of arm 97 and side 107 partly over the mouth of slot 98. Slides 91 (FIG. 11) are made to run on two horizontal rails 93, fixed to sides 11, 12 and fitted to the front 14 of the apparatus, by means of skids 92.

When rods 87 are in the idle position (FIG. 8), one slide is engaged with a pin 116 of a lever 117, which pivots about a pin 118 of side 11 and is normally pulled against a fixed stop 121 by a spring 119.

Slides 91 carry a carriage or cross-member 95 on which are mounted a pair of pincers 96. In particular, cross-member 95 moves alternately between an idle position, as shown on the right of FIG. 3, and a forward operating position, as shown by the dotted lines on the left of FIG. 3. The pincers 96, during the forward travel of the cross-member 95 extract an envelope 26 from arms 22 and take it to the receiving stacker 17, while during the return travel of the said cross-member they push the envelope 26 for treatment from the loading stacker 16 inside arms 22.

A fixed stop 103 on frame 10 near the bottom of the forward travel of cross-member 95 serves to stop envelope 26 in the extraction stage, disengage it from the pincers 96 and allow it to fall into stacker 17.

Each pincer 96 (see also FIGS. 9 and 11) includes a bottom block 110 to which is attached a fixed rubber shoe 111. Block 110 has two tabs 112 serving as pivots for a support 113 to which is attached a movable rubber shoe 114. A spring 116 normally keeps the movable shoe 114 against the fixed shoe 111. In addition, each support 113 is provided with a pin 122 that engages with a corresponding side tab 123 of the movable plate 50.

Figure 13:
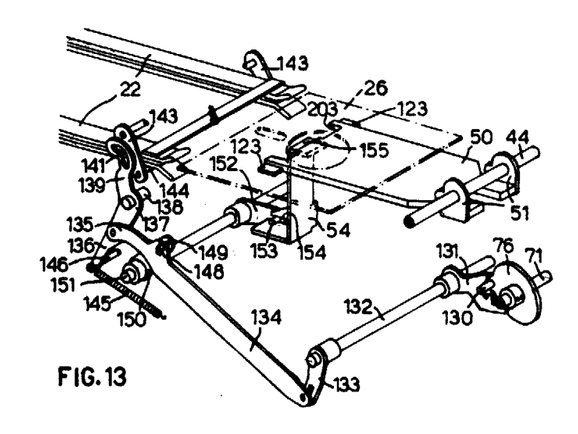
FIG. 13 is a perspective view showing a sixth detailed view of the apparatus according to the invention in one of its operating positions.

Cam 76 (FIGS. 3 and 13) is formed of a disk from which there projects a tab bearing a pin 130. The cam 76 serves to operate the mechanism that actuates arms 22 and slider 54. This mechanism includes a cam-follower lever 131 attached to a shaft 132 rotating on frame 10 and bearing a fixed arm 133. A slider 134 is coupled to this arm 113 by means of a pivot and a slot. One end 135 of the slider 134 pivots with the lower arm 136 of a lever 137 that is pivoted on a fixed pin 138. The upper arm 139 of lever 137 has a slot 141 in which is lodged a pin 142 of a lever 143. Lever 143 pivots about the fixed plate 20 of the unit 18 and its bottom end has a pin 144 that engages with the bottom part of one of the arms 22. A spring 145 normally keeps the lower arm 136 of lever 137 against a fixed stop 146.

Slider 134 has a yoke 148 that engages with the pin 149 of a lever 150 attached to a shaft 151 bearing a lever 152 which carries a pin 152 engaged with a yoke 154 of slider 54. The top end 155 of slider 54 (FIGS. 5 and 13) also has a bend that engages with the rear end of movable plate 50.

Figure 9:
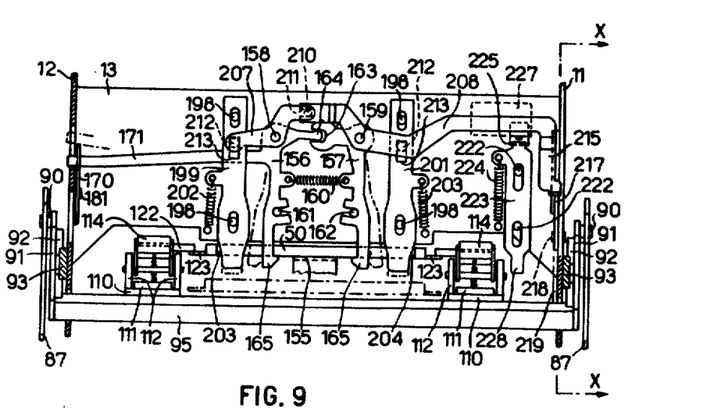
FIG. 9 shows a section taken along line IX—IX in FIG. 3.

A mechanism to keep plate 50 up and pincers 96 open during the writing and/or reading of disks inserted in the unit 18 is mounted on the transverse plate 13 (FIG. 9). This mechanism comprises a pair of levers 156, 157 that pivot on fixed pins 158, 159 and are joined to each other by means of the yoke 163 plus pin 164 coupled therebetween, while a spring 160 normally keeps levers 156,157 against two fixed stops 161, 162. In addition, levers 156,157 each have a bottom hook 165 that engages with a lateral edge of plate 50. One arm of lever 156 is engaged with a slider 170, by means of which levers 156,157 are turned from their idle position to the operating position indicated by the dotted lines in FIG. 9.

Cam 77 (FIG. 5) is also formed of a disk from which there projects a tab bearing a pin 175 that operates the mechanism which actuates the feeding roller 57. This mechanism comprises a cam follower lever 176 pivoted on a pin 177 of frame 10 and connected by means of its arm 178 to a rod 180 attached to the bottom end of slider 170, which is slidably mounted with respect to two fixed pins 181 of the side 12. Slider 170 has an inclined edge 183 that engages with arm 171 of lever 156, while its other end 182 engages with pin 184 of lever 185, which is pivoted on pin 44 and is normally pulled in the direction of slider 170 by a spring 187. One end 188 of lever 185 is connected via a small rod 189, to a pin 190 of roller 57.

Roller 57 (FIG. 6) has a second lateral pin 191 on which is pivoted a lever 192 that has a hook 193 at one end and also bears a pin 194 that, by means of a spring 195, is made to engage with the shaped bottom profile 196 of a cam 197 fitted to the lateral tabs 51 of plate 50. To the side of levers 156,157 and slidable with respect to fixed pins 198, two sliders 199, 201 (FIG. 9) are mounted on plate 13 and are normally held down by their respective springs 202, 203. When in the idle position, the sliders 199, 201 have their bottom part housed in two recesses 203,204 of the plate 50. When plate 50 is lowered (FIG. 5), the gap between sliders 199,201 and the plate 50 itself is 1.5 mm, which is substantially the same as the centre thickness of an envelope 26 containing a disk 25. This ensures that only the envelope 26 at the bottom of the pack contained in stacker 16 is taken and inserted between the arms 22.

Furthermore, to prevent the flaps 79 of the sleeve from catching against sliders 199,201 when the outer edge of the envelope 26 passes under said sliders 199, 201, a mechanism operated by the cross-member 95 (FIG. 9) raises sliders 199, 201 through an additional distance of 2.5 mm. This mechanism consists of a pair of levers 207, 208 pivoting about pins 158 and 159 respectively of levers 156,157 and connected to each ther by means of a pin 210 plus yoke 211 coupling. Each lever 207, 208 has a pin 212 lodged in a slot 213 of sliders 199,201. In addition, one end 215 of lever 208 (see FIG. 10) engages with the upper edge 216 of a lever 217 pivoted on a pin 218 on side 11, while one end of lever 217 engages with the cross-member 95. A spring 220 normally keeps lever 217 resting with its shoulder 221 against plate 13.

A sensing device 223 is also mounted on plate 13 in a slidable manner with respect to two fixed pins 222. This device 223 is normally held down by a spring 224 and has an upper tab 225 which serves to actuate a limit switch 227. The lower end 228 of device 223 can detect the partial insertion of an envelope 26 between arms 22, or the simultaneous insertion of two envelopes 26. In the idle position, in fact, end 228 is set in such a way that, when arms 22 are brought from the insertion position to the operating position and an envelope 26 is fully inserted, no part of said envelope protrudes beyond arms 22, with the result that device 223 stays down and leaves limit switch 227 open. If, on the other hand, two envelopes 26 are mistakenly inserted at the same time between arms 22, or if a single envelope is only partly inserted and arms 22 are brought towards the operating position, device 223 is pushed upwards by the parts of the envelope 26 protruding beyond the front end of the arms.

Cam 78 (FIG. 14) consists of a disk from which there protrudes a tab carrying a pin 230 designed to engage with a lever 231 pivoting on a fixed pin 232 of the frame 10. This lever 231 has a lower arm 233 shaped in such a way as to have a profile 234 that is variously distant from pin 232 so as to operate a limit switch 235 that changes the direction of the motor 70 current, when lever 231 is rocked by cam 78.

Cam 83 (FIGS. 3 and 12) is formed of a disk with two profiles 237 and 238 of substantially constant radius, one larger than the other, and a tab 239 that projects with respect to said profiles A pin 236 forming part of a lever 240 engages with cam 83. Lever 240 pivots on a fixed pin 241 and has a blade 242 that works in conjunction with a slider 243, and another blade 246 that works in conjunction with an end-of-cycle limit switch 247 that is normally closed and is arranged in series with the motor 70. Slider 243 is mounted in a slidable manner on fixed pins 245 forming part of the frame 10, and is normally held in the direction of blade 242 by a spring 244.

A normally closed limit switch 250, mounted on the frame 10 alongside limit switch 247, is in series with the motor 70 and designed to be opened when shutter 40 is open. In particular, one of the tabs 43 of the shutter 40 is connected to a slider 251 that has a blade 252 designed to work in conjunction with slider 243 and is connected in its turn, by means of a flexible coupling 253, to an actuator 254 that engages the limit swich 250. Lastly, a limit switch 260 (FIG. 15) is provided to be actuated when an envelope 26 containing an already treated disk 25 is fully withdrawn from the arms 22. In particular, a lever 261, pivoting on the frame 10, has a blade 262 facing limit switch 260, a pin 263 engaging with the automatic mechanism 29 for expelling the envelope 26, and a blade 264 that engages with the end 265 of a slider 266. A spring 267 normally holds blade 262 against limit switch 260. Slider 266 is connected to a lever 267, which pivots about the frame 10 and has a blade 268 that is set substantially beside fixed stop 103 and is designed to engage with the envelope 26 when this has left arms 22.

The apparatus thus far described operates in the following manner.

In the idle state, shutters 30 and 40 are closed (FIG. 3); the electric motor 70 (FIG. 11) is still; plate 50 is raised and attached to the hooks 165 (FIG. 9); slider 170 (FIG. 5) is to the rear (to the right in the figure) and holds down the feeding tooth 58; cross-member 95 (FIG. 3) is to the rear (to the right in the figure) and pincers 96 are open.

In a typical application, the apparatus is connected to a data handling system. While a single envelope 26 containing a magnetic disk 25 for writing and/or reading is inserted into the unit 18 by hand, envelopes 26 with their respective disks 25 forming part of a pack are handled sequentially and automatically.

When the top shutter 30 opens, pin 33 engages with the bottom part of arms 21 and turns them clockwise against the springs 120 so as to bring them into the insertion position (shown as dotted lines in FIG. 3). In this position, a single envelope 26 containing, for example, instructions for an operating programme stored on its disk 25 can be inserted into the unit 18. When the shutter closes, disk 25 is positioned with regard to the respective spindle 27 and head 28 as described in U.S. Pat. No. 4,024,581 already cited.

Shutter 40 is turned anticlockwise (FIG. 4) to enable the pack of envelopes 26 to be inserted into the loading stacker 16 through the front aperture 53. Crank 64 is brought to the upright position against the action of spring 79 and slides slider 65 forward (to the left in the figure). Due to the action of its side 68 on pin 69, slider 65 turns lever 60 clockwise and lifts pressure plate 59. In addition, the opening of shutter 40 lowers slider 251 (FIGS. 3 and 12) and slider 243, which thus actuates limit switch 250. Such actuation prevents energisation of the motor 70. Once the pack of envelopes 26 is in the stacker 16, shutter 40 is closed (FIG. 3). Limit switch 250 is in the closed position and pressure plate 59 holds the envelopes 26 down owing to the force exerted by spring 58.

For commencing the cycle, an operative key (not shown in the drawings) is depressed, or as the result of a command given by the data handling system, a predetermined voltage is supplied to the motor 70 so as to initiate an automatic loading cycle for the envelopes 26 stacked in the stacker 16. This cycle first provides for the withdrawal of any envelope 26 already inserted between arms 22 and then the loading of a fresh envelope 26. In particular, energisation of the motor 70 permitted by closure of limit switches 247 and 250 and by the inversion switch 235, turns shaft 71 anticlockwise via the transmission components 72,73,74.

When shaft 71 has turned through about 25°, pin 236 of lever 240 engages with the top profile 237 of cam 83, and lever 240 turns anticlockwise allowing spring 244 to shift slider 243 forward (to the left in the figure) and bring it under blade 252 of slider 251. In this way, shutter 40 is blocked and cannot be reopened until the end of the cycle.

After shaft 71 has turned anticlockwise through a further 30°, cam 76 releases its pin 130 from lever 131, and this lever 131 turns clockwise to bring down slider 134, which turns lever 137 clockwise and lever 150 anticlockwise. The rotation of lever 150 lowers slider 54, but not plate 50, which remains attached to the hooks 165 (FIG. 9). The rotation of lever 137 (FIG. 3), on the other hand, lowers arms 22 and, when arm 136 is arrested against pin 146, arms 22 are set in a substantially horizontal position. In such position, any envelope 26 that happens to be already between arms 22 is automatically expelled by mechanism 29 in the manner described in the already cited U.S. Pat. No. 4,024,581 and placed between the open jaws 111,114 of pincers 96. Furthermore, the stud 99 (FIG. 8) of crank 75 engages slot 98 and turns connecting rods 87 a few degrees clockwise in opposition to the action of spring 119, thus causing a slight rightward shift of pincers 96 for a firmer grip of the envelope 26 expelled from arms 22.

After about another 10° rotation on the part of shaft 71, stud 99 goes right inside slot 98 and, by pushing against the side 107, turns lever 101 anticlockwise, so that its tooth 102 is released from fixed pin 104.

Figures 8, 10:
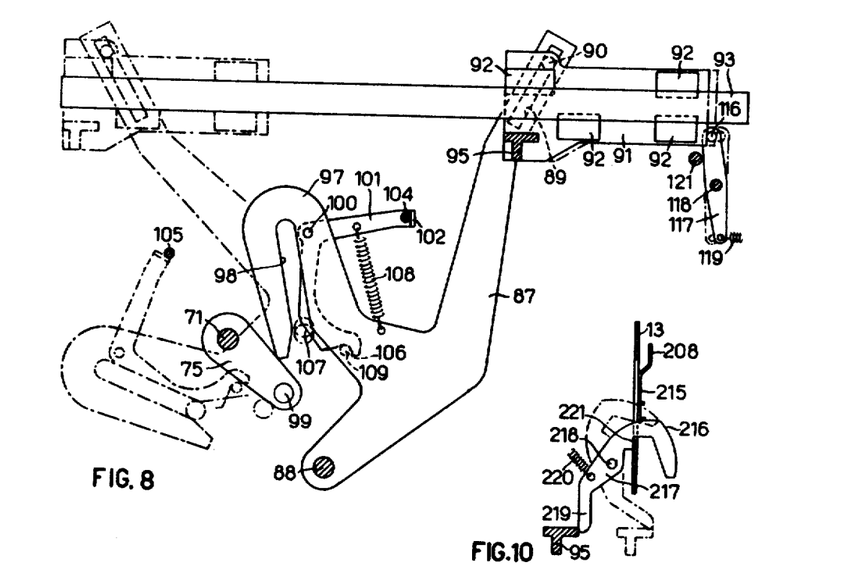
FIG. 8 is a fourth detailed view of the apparatus according to the invention in its idle position.
FIG. 10 shows a section taken along line X—X in FIG. 9.

A further 225° anticlockwise rotation on the part of crank 75 turns connecting rods 87 anticlockwise and brings cross-member 95 forwards (to the left in the figure) to the position shown by means of dotted lines in FIG. 8. Spring 119 is under load and applies a force to slides 91 at the commencement of their travel to overcome the inertia of the mechanism.

Figures 14, 15, 16A, 16B, 16C:
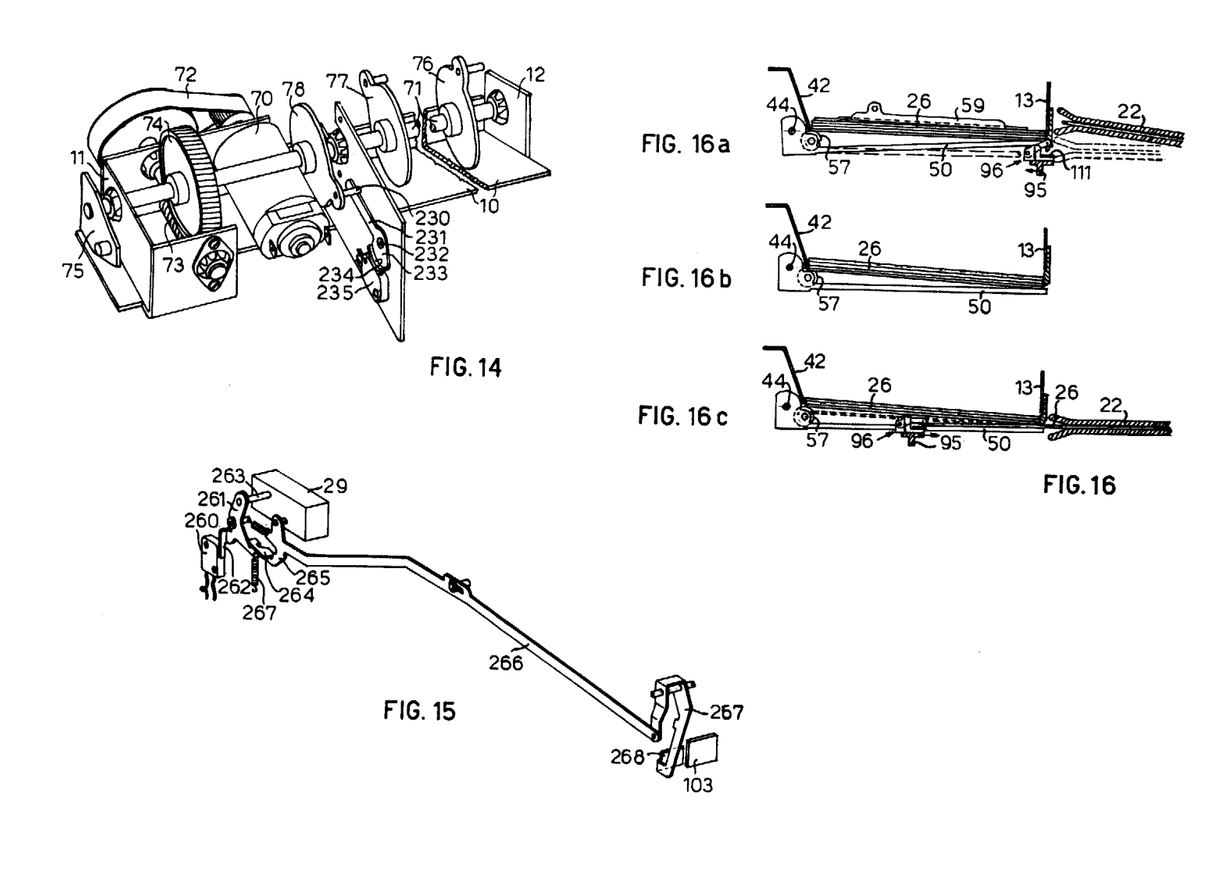
FIG. 14 is a perspective view showing a seventh detailed view of the apparatus according to the invention.
FIG. 15 is a perspective view showing an eighth detailed view of the apparatus according to the invention in its idle position.

Pincers 96 move to the left (FIG. 3), together with cross-member 95, and, after a short distance, cause their pins 122 to disengage themselves from the tabs 123 of plate 50. The springs 116 then close the pincers 96, so that the envelope 26 is gripped between jaws 111 and 114. Pincers 96 proceed leftwards and thus fully withdraw the envelope 26 from arms 22 (FIG. 16a).

When envelope 26 reaches the set stop 103 (FIGS. 3 and 15), blade 268 is pushed back and the end 265 of striker 266 is unhooked by blade 264 of lever 261. Lever 261 thus turns clockwise due to the action of spring 267 and actuates limit switch 260, which supplies the control unit with a signal indicating that the envelope 26 has been fully withdrawn. Envelope 26, when it meets set stop 103, does, in fact, come free from pincers 96 and falls by the force of gravity into the underlying receiving stacker 17, landing on the fixed plate 62.

Subsequent to said rotation, crank 75 (FIG. 8) leaves slot 98, while lever 101, due to the action of spring 108, turns clockwise to bring its tooth-like bend 102 in front of fixed stop 105 to prevent unwanted backward displacement of cross-member 95.

In this stage, pin 175 (FIG. 5) of cam 77 is brought into contact with lever 176. When shaft 71 rotates through a further 50° approximately, pin 175 turns lever 176 clockwise, with the result that lever 176, by drawing down rod 180, shifts slider 170 forwards (to the left in the figure) into the position shown by means of dotted lines. Slider 170, in its turn, rotates lever 185 anticlockwise by means of one of its ends 182. Lever 185 thus shifts connecting rod 189 to the right so that it turns roller 57 anticlockwise and in this manner brings feeding tooth 58 upwards into position shown in FIG. 7.

Figure 7:
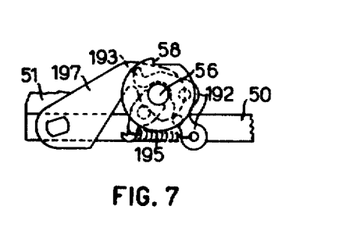
FIG. 7 shows the detailed view illustrated in FIG. 6 with the apparatus in one of its operating positions.

Lever 192 also turns together with roller 57 and, due to the action of cam 197 on pin 191, draws back tooth 193 with respect to roller and moves into the operating position illustrated in FIG. 7 against the action of spring 195. In addition, slider 170, by means of its inclined surface 183 (FIG. 5), raises arm 171 of lever 156 (FIG. 9) and rotates levers 156 and 157 so as to move them away reciprocally into the positions shown by means of dotted lines and release the from plate 50. Plate 50 falls due to the force of gravity into the position shown by means of a continuous line in FIGS. 5 and 16b.

During the final stage of the said rotation of shaft 71, pin 230 (FIG. 14) of cam 78 operates lever 231 so as to turn it and thus actuate limit switch 235 controlling the change of direction of the current to the motor 70. Motor 70 thus runs in the opposite direction and now turns shaft 71 clockwise (FIG. 3) to load a fresh envelope 26 into the unit 18.

In particular, during the first 55° of this rotation, slider 170 (FIG. 5) is brought backwards (to the right in the figure) under the action of spring 187. Lever 185 thus turns clockwise, as does roller 57. The tooth 58 of roller 57 pushes the envelope 26 lying at the bottom of the pack backwards (to the right in the figure). During this rotation of roller 57, tooth 193 of lever 192 is brought to the outside of roller 57 by cam 197 and engages the envelope 26 selected by the roller so as to push down the same envelope 26 until it fully rests on the underlying plate 50.

Stud 99 (FIG. 8) of crank 75 now re-engages slot 98 and, after moving lever 101 away from stop 105, turns connecting rods 87 clockwise from the position shown as a dotted lines to that shown as a continuous lines, thus shifting cross-member 95 backwards (to the right in the figure) and also shifting pincers 96 (FIG. 16c) along with the said cross-member. Pincers 96, which are closed, with the front part of their top jaws 114 push the selected envelope 26 to the right and insert it between arms 22. During this stage, sliders 199 and 201 (FIG. 9) are held down by springs 202 and 203 in such a way as to leave a 1.5 mm gap with respect to plate 50, the said gap being wide enough to permit the passage of the central portion of envelope 26, but at the same time narrow enough to prevent further envelopes from the pack from being inserted (FIG. 5) into the unit 18. When the selected envelope 26 is about to pass in its entirety under sliders 199 and 201, these sliders are raised a further 2.5 mm with respect to plate 50, in the position shown in FIG. 9, so as to enable the outer rear flap 79, even it is sticking up or has lost its shape, to come up against said sliders 199 and 201. For this purpose, cross-member 95 (FIG. 10), when it is on the point of completing its return run, pushes back end 219 of lever 217 so as to cause lever 217 to turn anticlockwise and thus lift end 215 of lever 208 (FIG. 9), which turns anticlockwise and raises sliders 199 and 201.

When stud 99 (FIG. 8) of crank 75 again leaves slot 98, connecting rods 87 have completed their clockwise rotation and returned to their idle position, and lever 101 has brought its tooth 102 behind fixed stop 104 so as to prevent any forward displacement of cross-member 95. In this position, envelope 26 is fully inserted between arms 22 and mechanism 29 is preset to expel the inserted envelope 26 after writing and/or reading of its respective disk 25, as described in the already cited U.S. Pat. No. 4,024,581. Mechanism 29 (FIG. 15) also drives the rotation of lever 261 and blade 264 is placed above end 265 of slider 266, while blade 262 is withdrawn from limit switch 260 and thus opens the said limit switch 260.

Further rotation of shaft 71 clockwise through 30° (FIG. 3) enables cam 76 to bring lever 131 back into the idle position. As a result of this, lever 150 is made to turn clockwise and slider 54 is pushed upwards, so as to bring plate 50 to the idle position. At the same time, arms 22 are again brought into the operating position. The raising of plate 50 also causes pincers 96 to open.

Once the loading cycle is finished, further clockwise rotation of shaft 71 through 25° enables cam 83 to come back to its initial position, and its tab 239 turns lever 240 clockwise, so that blade 246 once again opens limit switch 247 (which was closed when cam 83, in turning, brought its lower profile 238 into engagement with pin 236), and an end-of-cycle signal is generated. Lastly, blade pushes slider 243 to the right and so re-establishes the initial idle conditions. Cam 78 (FIG. 14), too, during the last part of the clockwise rotation of shaft 71, brings its pin 230 into engagement with lever 231, so as to turn lever 231 and thus re-open limit switch 235, which stop the motor 70.

While the invention has been described and illustrated in detailed it is to be understood that many modifications and variations of the present invention will be apparent to those skilled in the art.

What we claim is:

1. An apparatus for sequentially recording and/or reading one at a time a plurality of flexible magnetic disks piled one on top of the other, and for simultaneously recording and/or reading a single flexible magnetic disk, said apparatus comprising:

a unit for simultaneously recording and/or reading two flexible magnetic disks, said unit comprising a first and a second transducer, a first and a second driving spindle, first positioning means for positioning each disk of said plurality of disks with respect to said first transducer and said first driving spindle, and second positioning means for positioning said single disk with respect to said second transducer and said second driving spindle;

a loading stacker having a substantially horizontal base plate on which said plurality of disks are piled one on top of the other, said base plate being disposed substantially aligned with said first positioning means;

a receiving stacker disposed below said loading stacker for receiving each disk of said plurality of disks already recorded and/or read by said unit;

feeding means for sequentially feeding one at a time said plurality of disks from said loading stacker to said first positioning means of said unit;

ejecting means for ejecting each disk of said plurality of disks already recorded and/or read by said unit from said first positioning means to said receiving stacker; and introducing means for manually introducing said single disk into said second positioning means of said unit, said introducing means being operable independently from said feeding means, whereby the introduction of said single disk into said unit is independent from the feeding operation of each disk of said plurality of disks.

2. An apparatus according to claim 1, wherein said feeding means comprises a guide disposed substantially parallel to said base plate and a carriage movable on said guide in a first direction towards said unit and in a second direction away from said unit, said carriage comprising pushing means for pushing each disk of said plurality of disks towards said unit during the movement of said carriage in said direction, and pulling means for pulling away from said unit each disk of said plurality of disks already read and/or recorded by said first transducer, during the movement of said carriage in said second direction.

3. An apparatus according to claim 2, wherein said apparatus further comprises moving means for selectively and alternately moving said base plate between a first and a second position, for putting said first positioning means in communication with said receiving stacker and respectively with said loading stacker.

4. An apparatus according to claim 3 further comprising a feeding roller disposed in correspondence of said base plate for cooperating with each disk of said plurality of disks to position said disks in front of said carriage when said plate is in said second position.

* * * * *